US011949140B2

(12) United States Patent
Kosugi et al.

(10) Patent No.: US 11,949,140 B2
(45) Date of Patent: Apr. 2, 2024

(54) PILLBOX-TYPE RF WINDOW INCLUDING A PROTRUSION AND NOTCH ASSEMBLY FOR SUPPRESSING ROTATION OF THE WINDOW AND A MANUFACTURING METHOD THEREFOR

(71) Applicant: NEC Network and Sensor Systems, Ltd., Fuchu (JP)

(72) Inventors: Naofumi Kosugi, Tokyo (JP); Kenji Nakajima, Tokyo (JP)

(73) Assignee: NEC Network and Sensor Systems, Ltd., Tokyo (JP)

( * ) Notice: Subject to any disclaimer, the term of this patent is extended or adjusted under 35 U.S.C. 154(b) by 23 days.

(21) Appl. No.: 17/752,943

(22) Filed: May 25, 2022

(65) Prior Publication Data

US 2022/0384926 A1 Dec. 1, 2022

(30) Foreign Application Priority Data

May 31, 2021 (JP) ................................ 2021-091131

(51) Int. Cl.
*H01P 1/08* (2006.01)
*H01J 23/36* (2006.01)
*H01P 5/02* (2006.01)

(52) U.S. Cl.
CPC ................ *H01P 1/08* (2013.01); *H01J 23/36* (2013.01); *H01P 5/024* (2013.01)

(58) Field of Classification Search
CPC ........................................................ H01P 1/08
USPC ........................................................ 333/252
See application file for complete search history.

(56) References Cited

U.S. PATENT DOCUMENTS 2,869,086 A * 1/1959 Curtis et al. .............. H01P 1/08 333/252
3,101,461 A * 8/1963 Henry-Bezy et al. .... H01P 1/08 315/39
3,179,213 A * 4/1965 Kuehne et al. ........... H01P 1/08 403/30
5,072,202 A * 12/1991 Tikes et al. ............... H01P 1/08 333/252
2007/0241845 A1 10/2007 Machida

FOREIGN PATENT DOCUMENTS

JP 2007-287382 A 11/2007

* cited by examiner

*Primary Examiner* — Benny T Lee

(57) ABSTRACT

A pillbox-type RF window having an input/output window in a microwave tube, the pillbox-type RF window includes a disc-shaped member having a metallization layer formed on an outer peripheral portion of a disc-shaped ceramic body; a pair of ring-shaped members constituted by metal bodies having substantially the same outer diameters as the disc-shaped member, arranged to sandwich the disc-shaped member from both sides, and integrated with the outer peripheral portion of the disc-shaped member; a tube-shaped member constituted by a metal body having an inner diameter substantially equal to the outer diameters of the pair of ring-shaped members and the disc-shaped member, for holding the pair of metal components and the disc-shaped member on an inside thereof; and a restriction member for suppressing rotation between the ring-shaped members and the tube-shaped member.

6 Claims, 3 Drawing Sheets

PILLBOX-TYPE RF WINDOW INCLUDING A PROTRUSION AND NOTCH ASSEMBLY FOR SUPPRESSING ROTATION OF THE WINDOW AND A MANUFACTURING METHOD THEREFOR

This application is based upon and claims the benefit of priority from Japanese patent application No. 2021-091131, filed May 31, 2021, the disclose of which is incorporated herein in its entirety by reference.

TECHNICAL FIELD

The present invention relates to a pillbox-type RF window and a manufacturing method therefor.

BACKGROUND ART

In recent years, the frequencies used for communication and broadcasting have become increasingly higher and the bandwidth used has become wider for the purpose of increasing the capacity and speed of communication and broadcasting. In particular, in the fields of satellite broadcasting and satellite communications, high-power amplifiers characterized by higher output power and wider bandwidth are necessary, and traveling-wave-tube amplifiers are often used. Traveling wave tubes have vacuum portions in the interiors thereof, and have components called RF windows on RF transmission paths for separating the vacuum portions from atmospheric pressure portions.

As particularly high-power RF windows among these RF windows, pillbox-type RF windows, in which a dielectric is sandwiched in the RF transmission path, are widely used. However, unwanted resonances, called ghost modes, are known to occur in pillbox-type RF windows due to the dielectric and the RF window structure, and this presents an obstacle to wider operation bandwidth of TWTs.

As technology associated with pillbox-type RF windows used as such microwave input/output windows, Patent Document 1 (JP 2007-287382 A) has been filed.

This Patent Document 1 discloses technology wherein a pillbox-type RF window is provided as an input/output window for RF signals for the two purposes of reducing the loss of RF (radio frequency) signals in the microwave tube and vacuum-sealing the inside of the microwave tube.

In the aforementioned pillbox-type RF window, ghost modes sometimes occur in the operation bandwidth of TWTs. When such ghost modes occur, there is a risk that the frequency response of the gain/group delay in the TWTs and the return loss will become worse, thereby degrading the communication quality. Additionally, power loss due to the ghost modes can generate heat in the dielectric, and the heat leads the stress associated with thermal expansion. This stress can form cracks that can cause loss of function of separating the vacuum portion from the atmospheric pressure portion, which is the primary purpose of an RF window.

Therefore, as a measure against the occurrence of ghost modes in the operation bandwidth of TWTs, it is possible to prepare multiple types of components and to choose components in combinations such that ghost modes are not likely to occur in the frequency bandwidth being used, thus solving the problem by selection from a large number of components. However, the losses associated with the selection of appropriate components is a problem that is a factor in preventing the prices of traveling wave tubes from becoming lower.

SUMMARY OF THE INVENTION

An example of an objective of the present invention is to provide a pillbox-type RF window that can suppress the occurrence of ghost modes in the operation bandwidth of TWTs.

The present invention proposes the means below for solving the above-mentioned problem.

A pillbox-type RF window according to a first aspect of the present disclosure is a pillbox-type RF window constituting an input/output window in a microwave tube, wherein the pillbox-type RF window has a disc-shaped member having a metallization layer formed on an outer peripheral portion of a disc-shaped ceramic body; a pair of ring-shaped members constituted by metal bodies having substantially the same outer diameters as the disc-shaped member, arranged to sandwich the disc-shaped member from both sides, and integrated with the outer peripheral portion of the disc-shaped member; a tube-shaped member constituted by a metal body having an inner diameter substantially equal to the outer diameters of the pair of ring-shaped members and the disc-shaped member, for holding the pair of metal components and the disc-shaped member on an inside thereof; and a restriction member for suppressing rotation between the ring-shaped members and the tube-shaped member.

A manufacturing method for a pillbox-type RF window according to a second embodiment of the present disclosure is a manufacturing method for a pillbox-type RF window having an input/output window in a microwave tube, wherein the manufacturing method has fabricating a disc-shaped member in which a metallization layer is formed on an outer peripheral portion of a disc-shaped ceramic body; fabricating a pair of ring-shaped members by metal bodies having substantially the same outer diameters as the disc-shaped member; sandwiching the disc-shaped member from both sides by the ring-shaped members and integrally bonding the disc-shaped member therewith; arranging the pair of ring-shaped members and the disc-shaped member inside a tube-shaped member constituted by a metal body having an inner diameter substantially equal to the outer diameters of the pair of ring-shaped members and the disc-shaped member; and furthermore, before the arranging the pair of ring-shaped members and the disc-shaped member inside the tube-shaped member, positioning the ring-shaped members with respect to the tube-shaped member in a circumferential direction by restriction members that restrict rotation between the ring-shaped members and the tube-shaped member.

DETAIL DESCRIPTION OF THE EMBODIMENTS

Figure 1:
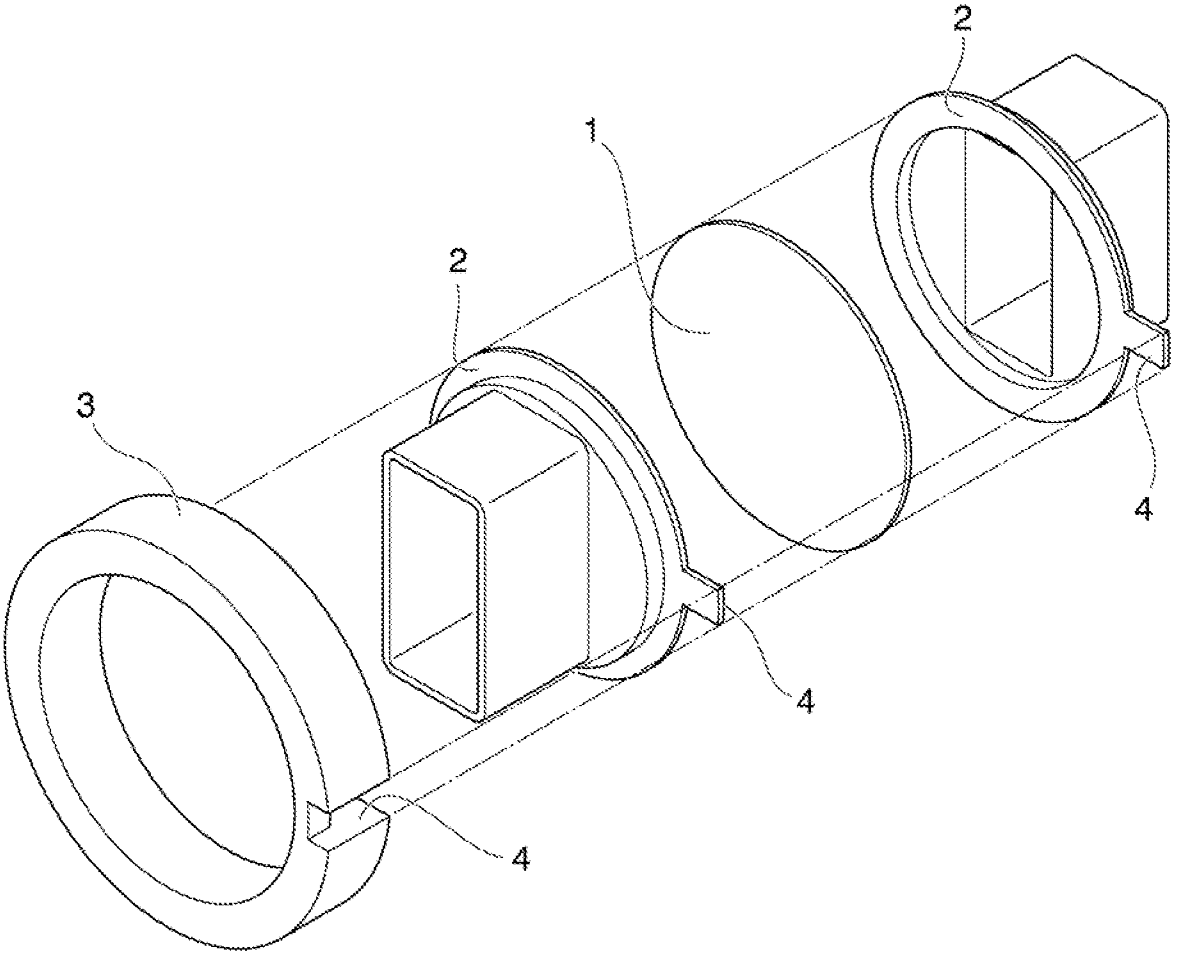
FIG. 1 is a perspective view of a minimum-configuration example of the pillbox-type RF window according to the present disclosure.

The pillbox-type RF window according to the minimum-configuration example of the present disclosure will be explained with reference to FIG. 1. FIG. 1 is a perspective view of the minimum-configuration example of the pillbox-type RF window.

The pillbox-type RF window according to this minimum configuration is a pillbox-type RF window having an input/output window of a microwave tube, and having a disc-shaped member 1, a pair of ring-shaped members 2, a tube-shaped member 3 and restriction members 4. The disc-shaped member 1 is an element in which a metallization layer is formed on the outer peripheral portion of a disc-shaped ceramic body. The pair of ring-shaped members 2 are constituted by metal bodies having substantially the same outer diameters as the disc-shaped member 1, which are arranged so as to sandwich the disc-shaped member 1 from both sides and are integrated with the outer peripheral portion of the disc-shaped member 1. The tube-shaped member 3 is constituted by a metal body having an inner diameter substantially equal to the outer diameters of the pair of ring-shaped members 2 and the disc-shaped member 1, and hold the pair of metal components and the disc-shaped member on the inside thereof. The restriction members 4 suppress rotation between the ring-shaped members and the tube-shaped member.

The pillbox-type RF window configured as indicated above is mounted in a state in which the ring-shaped members 2, together with the ceramic disc-shaped member 1, are restricted from rotating with respect to the tube-shaped member 3 by the restriction member 4. As a result thereof, ghost mode caused by misalignment in the rotation direction can be suppressed.

Figure 2:
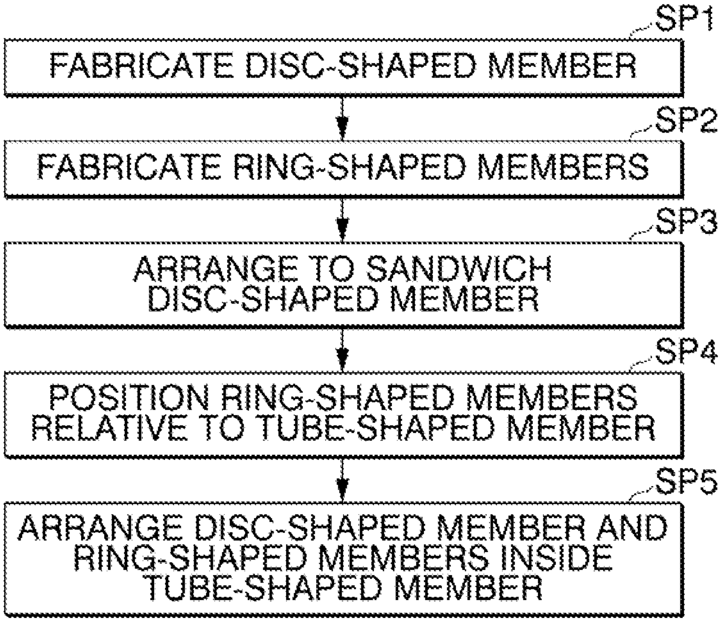
FIG. 2 is a step chart for a minimum-configuration example of the manufacturing method for a pillbox-type RF window according to the present disclosure.

The manufacturing method for the pillbox-type RF window according to the minimum configuration of the present disclosure will be explained with reference to FIG. 1 and FIG. 2. FIG. 2 is a step chart for the minimum-configuration example of the manufacturing method for the pillbox-type RF window.

The manufacturing method for the pillbox-type RF window constituting the input/output window of a microwave tube according to this minimum configuration has step SP1 to step SP5. Step SP1 involves fabricating a disc-shaped member 1 illustrated in FIG. 1 in which a metallization layer is formed on the outer peripheral portion of a disc-shaped ceramic body. Step SP2 involves fabricating a pair of ring-shaped members 2 illustrated in FIG. 1 by metal bodies having substantially the same outer diameters as the disc-shaped member 1. Step SP3 involves sandwiching the disc-shaped member 1 from both sides by the ring-shaped members 2 and integrally bonding the disc-shaped member 1 therewith. Step SP5 involves arranging the pair of ring-shaped members 2 and the disc-shaped member 1 inside a tube-shaped member 3 illustrated in FIG. 1 constituted by a metal body having an inner diameter substantially equal to the outer diameters of the pair of ring-shaped members 2 and the disc-shaped member 1. The manufacturing method for the pillbox-type RF window further has, before the step of arranging the pair of ring-shaped members 2 and the disc-shaped member 1 inside the tube-shaped member 3 (step SP5), a step of positioning the ring-shaped members 2 with respect to the tube-shaped member 3 in the circumferential direction by restriction members 4 illustrated in FIG. 1 that restrict rotation between the ring-shaped members 2 and the tube-shaped member 3 (step SP4).

According to the above-mentioned manufacturing method, the pillbox-type RF window is mounted in a state in which the ring-shaped members are restricted from rotating relative to a cylinder member by the restriction members 4. As a result thereof, ghost mode caused by misalignment in the rotation direction can be suppressed.

The configuration according to one embodiment of the present disclosure will be explained with reference to FIG. 3 to FIG. 5. The features that are common to those in FIG. 1 will be assigned the same reference numbers and the descriptions thereof will be simplified.

This pillbox-type RF window is connected to the beginning part and ending part of RF circuit (vacuum region) of a traveling wave tube, and serves the function of an inlet/outlet for allowing microwaves into a vacuum or of an inlet/outlet for allowing the microwaves out into the atmosphere.

Figure 3:
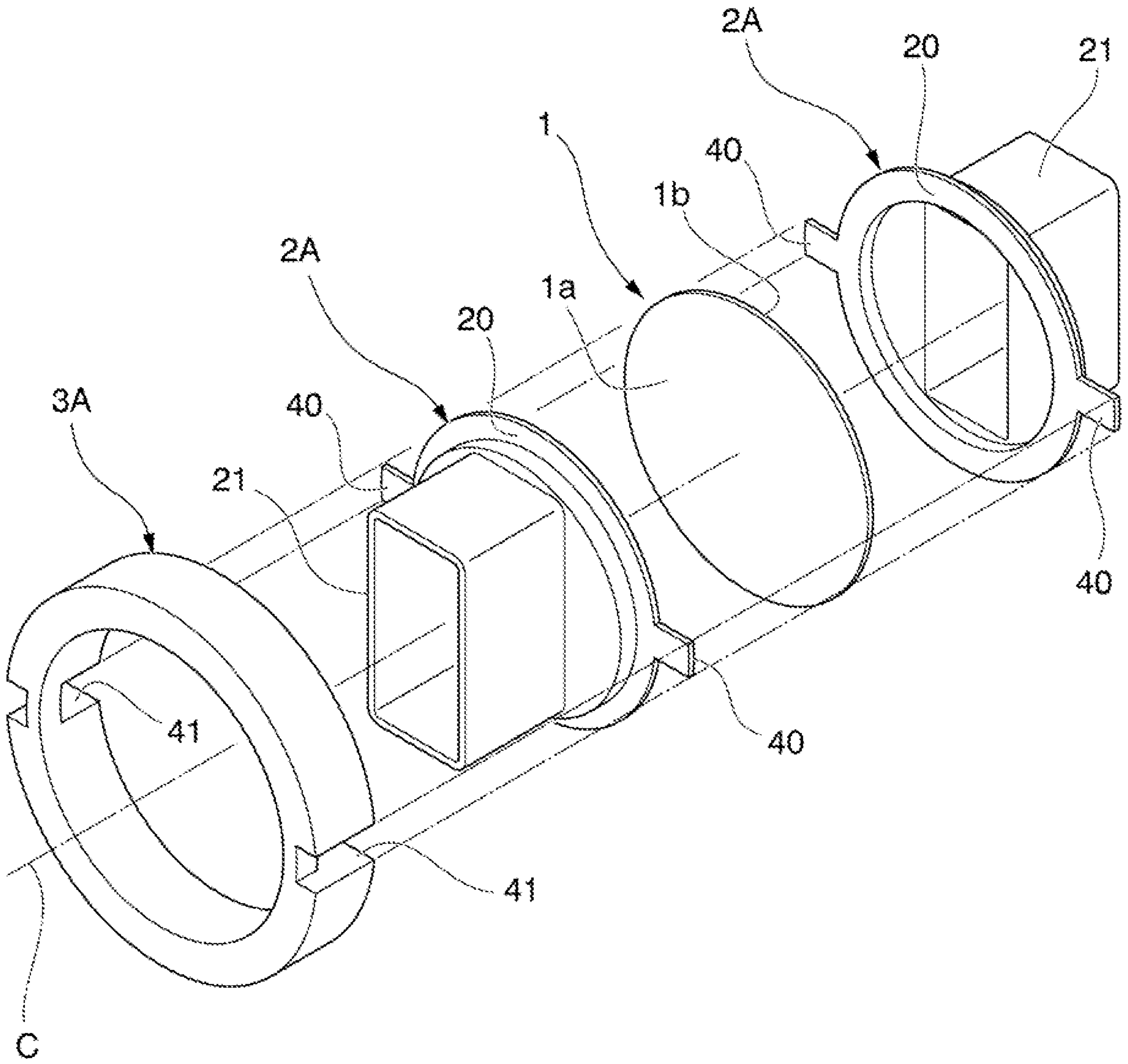
FIG. 3 is a perspective view of a pillbox-type RF window according to one embodiment of the present disclosure.

As illustrated in FIG. 3, the pillbox-type RF window in the one embodiment, like the minimum-configuration example, has a disc-shaped member 1 in which a metallization layer is formed on the outer peripheral portion 1*b* of a main body 1*a* constituted by a disc-shaped ceramic body. Additionally, ring-shaped members 2A are arranged on both sides of the disc-shaped member 1 so as to sandwich the disc-shaped member 1 from both sides.

The ring-shaped members 2A each have a ring-shaped main body 20 that is composed of a metal, one of the surfaces of the ring-shaped main body 20 having a rectangular waveguide 21 that is configured to be in a square tubular shape from a single metal body. Furthermore, the rectangular waveguide 21 on one of the pair of ring-shaped members 2A is connected to an RF circuit (vacuum region), and the other rectangular waveguide 21 is connected to an atmospheric pressure region.

The tube-shaped member 3A is constituted by a metal body having an inner diameter substantially equal to the outer diameters of the pair of ring-shaped members 2A and the disc-shaped member 1, and is configured to be tube-shaped so as to hold the pair of ring-shaped members 2A and the disc-shaped member 1 on the inside thereof. The tube-shaped member 3A has notches 41 arranged to divide the entire body into two half-cylindrical shapes. These notches 41 partition the tube-shaped member 3A into upper and lower regions respectively forming a halved shape. Additionally, the notches 41 penetrate through the tube-shaped member 3A, in a direction parallel to the axis C, at outer peripheral portions thereof, and also penetrate through the tube-shaped member 3A, in the radius direction, at positions towards one of the side surfaces thereof. Additionally, the sizes of the notches 41 are set to be large enough to allow protrusions 40 to pass therethrough. Furthermore, the protrusions 40 and the notches 41 form restriction portions that restrict the rotation of the each ring-shaped member 2A and the tube-shaped member 3A about the axis C.

The pillbox-type RF window having the above-mentioned configuration is manufactured by forming the disc-shaped member 1, the ring-shaped members 2A and the tube-shaped member 3A with the shapes respectively illustrated in FIG. 3, then assembling the above in accordance with the steps indicated below. FIG. 3 is a perspective view of the pillbox-type RF window according to one embodiment.

The disc-shaped member 1 is sandwiched between the pair of ring-shaped members 2A and integrated by brazing, using the metallized portions at the outer peripheries thereof.

In this case, the pair of ring-shaped members 2A are combined so that the positions of the protrusions 40 are aligned with each other in the circumferential direction.

The protrusions 40 are positionally aligned with the notches 41 in the tube-shaped member 3A, and the disc-shaped member 1 and the ring-shaped members 2A that have been integrated are inserted in the cylinder member 3A.

By the protrusions 40 being inserted into the notches 41, the disc-shaped member 1 and the ring-shaped members 2A are positioned in the rotation direction about the axis C inside the cylinder member 3A. Additionally, the disc-shaped member 1 and the ring-shaped members 2A are integrally fixed to the cylinder member 3A by brazing.

The pillbox-type RF window configured as above is used by connecting one of the rectangular waveguides 21 to an RF circuit (vacuum region) from an electron gun to a collector, and by connecting the other rectangular waveguide 21 to a circuit component or the like on a side open to the atmosphere. For example, it is used for connection to an electronic component for inputting and outputting RF signals with respect to the RF circuit.

The functions of the pillbox-type RF window in one embodiment will be explained in comparison with a comparative example, which is a prior art, illustrated in FIG. 4. First, the pillbox-type RF window of the comparative example will be explained by means of FIG. 4. FIG. 4 is a perspective view of a pillbox-type RF window according to a comparative example for the one embodiment.

Figure 4:
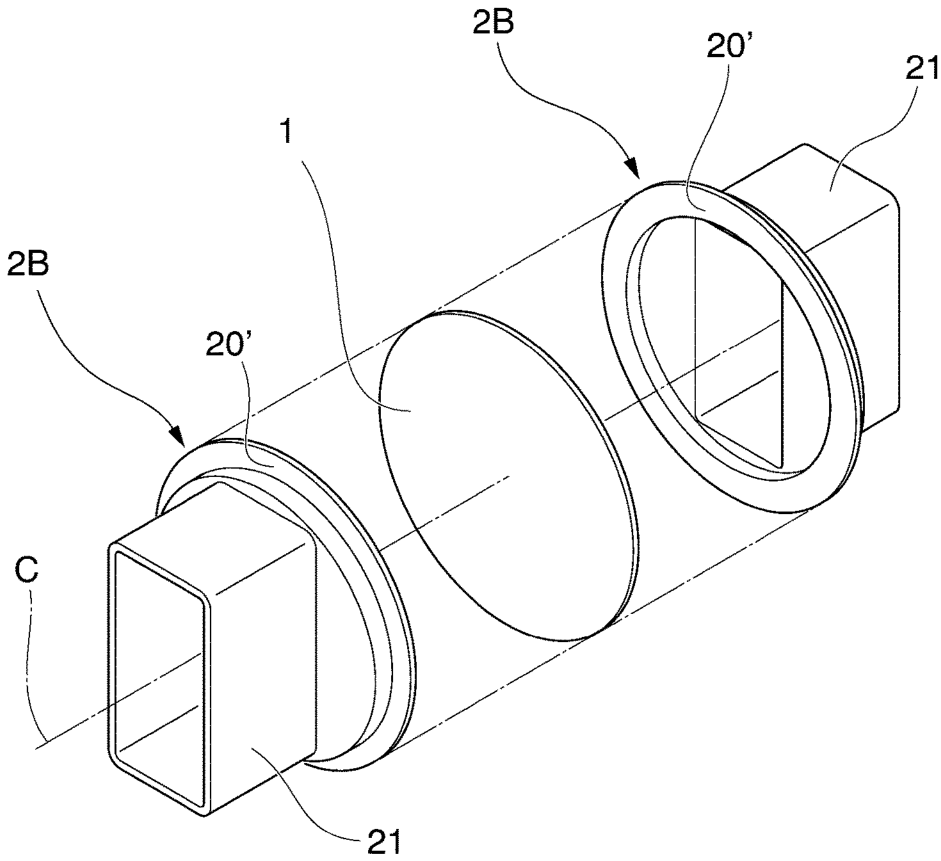
FIG. 4 ( prior art )
FIG. 4 is a perspective view of a pillbox-type RF window according to a comparative example for one embodiment.

The pillbox-type RF window illustrated in FIG. 4 has a configuration in which the disc-shaped member 1 that is constituted by a plate-shaped ceramic body is sandwiched from both sides by a pair of ring-shaped members 2B.

The ring-shaped members 2B each have a ring-shaped main body 20' (lacking protrusions as in the ring-shaped body in the one embodiment) constituted by a metal body. One surface of this ring-shaped main body 20' has a rectangular waveguide 21 constituted by a single metal body.

The pillbox-type RF window of this comparative example is not provided with restriction members comprising protrusions and notches. Thus, the components constituting the RF window can sometimes be misaligned in the rotation direction (the direction about the axis C) at the time of assembly.

Additionally, this misalignment in the rotation direction causes ghost modes to occur. FIG. 5 illustrates examples of measurement of characteristics (the magnitude of the return loss caused by ghost modes) in the cases in which the pillbox-type RF window of the comparative example is used and the misalignment amounts in the rotation direction (rotation angles) are 4° and 10°, and in the case in which the pillbox-type RF window of one embodiment is used and is thus assembled in a state in which there is no misalignment (0°) in the rotation direction.

Figure 5:
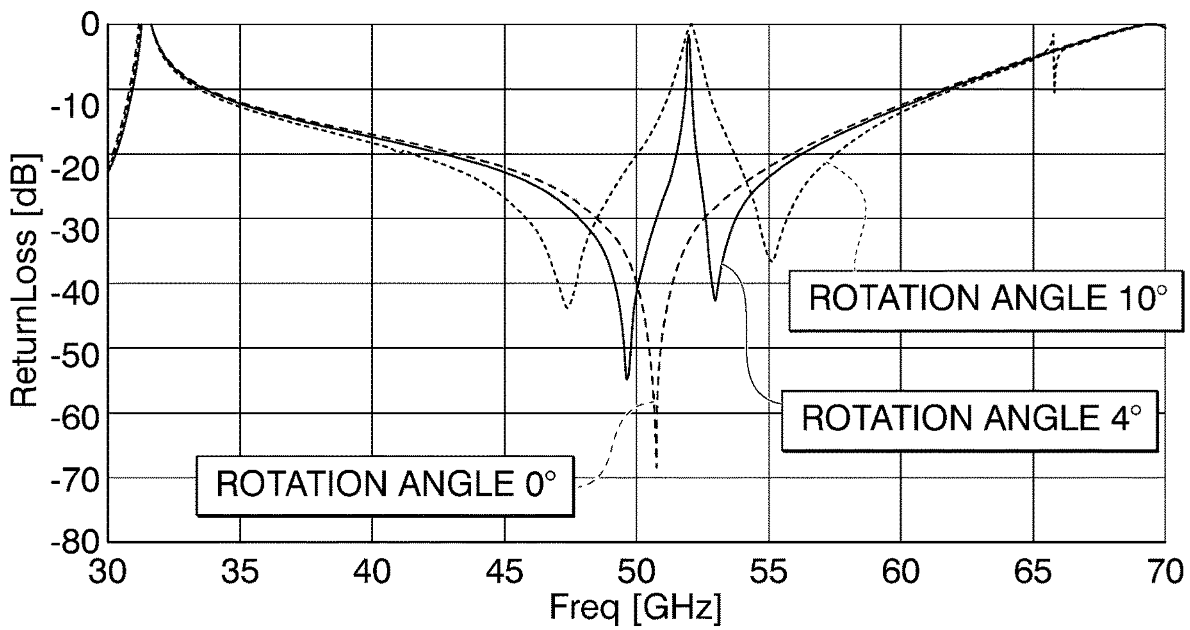
FIG. 5 is a diagram indicating the loss characteristics at rotation angles of 0°, 4° and 10° in pillbox-type RF windows in one embodiment and a comparative example.

FIG. 5 is a diagram indicating the loss characteristics (i.e. return loss in dB vs. frequency in GHz) at rotation angles of 0°, 4° and 10° in pillbox-type RF windows in the one embodiment and the comparative example. As indicated in FIG. 5, by using the pillbox-type RF window of the one embodiment, in the case in which the rotation angle is 0°, characteristics with the minimum return loss occurred at a frequency of 51 GHz (gigahertz).

In contrast therewith, in the analysis example for the case in which the pillbox-type RF window of the comparative example was used and the rotation angle was 4°, the maximum return loss occurred at a frequency slightly higher than 51 GHz, and the minimum return loss occurred on both the higher frequency side and the lower frequency side of 51 GHz. Additionally, in the measurement example in which the rotation angle was 10°, the maximum return loss occurred at a frequency slightly higher than 51 GHz, and the minimum return loss occurred on both sides of 51 GHz, further on the lower frequency side and further on the higher frequency side relative to the case in which the rotation angle was 4°.

However, it can be understood that, in the case in which the pillbox-type RF window of the comparative example was used, whether the rotation angle was 4° or 10°, the minimum return loss was greater than that in the case in which the pillbox-type RF window of the one embodiment was used and the rotation angle was 0°.

As explained above, the pillbox-type RF window of the one embodiment has support components added to a pillbox-type RF window, and differs from pillbox-type RF windows in general by having a structure in which rotation is restricted by having a notch/protrusion structure on an RF transmission component and on the support components. Therefore, by fitting these notch/protrusion structures together at the time of assembly, changes in the angles of the components in the rotation direction can be suppressed, and the detrimental influence by ghost modes on the used bandwidth can be suppressed.

Additionally, with the pillbox-type RF window according to the structure of the one embodiment and the manufacturing method, effects can be obtained and the objective can be achieved by the following features in the configuration:

(1) Notch/protrusion structures are provided in a direction orthogonal to the axis C.

Due to this feature, a simple structure using a ceramic body with a basic circular shape similar to the comparative example is possible, thereby contributing to improved productivity and lower cost.

(2) Protrusion structures are provided on the RF transmission component and notch structures are provided in the support components.

Due to this feature, there is no need to machine notches in the ceramic body, which would be necessary in the case in which notch structures are provided in the RF transmission component and protrusion structures are provided on the support components. Thus, there is no risk of cracks developing from the notched portions or the like, thereby contributing to productivity increases.

As a result thereof, a traveling wave tube provided with a pillbox-type RF window can be provided at a lower cost.

Additionally, aside from pillbox-type RF windows for traveling wave tubes, the present disclosure can be applied generally to electron tubes having vacuum portions, such as klystrons and gyrotrons.

Additionally, according to at least one exemplary embodiment, for example, it is possible suppress ghost modes in pillbox-type RF windows.

While the present embodiment has been described in detail by referring to the drawings, the specific configuration is not limited to this embodiment, and design modifications and the like within a range not departing from the spirit of these embodiments are also included.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present embodiment can be used in an RF transmission apparatus.

What is claimed is:

1. A pillbox-type RF window having an input/output window in a microwave tube, the pillbox-type RF window comprising:

a disc-shaped member having a metallization layer formed on an outer peripheral portion of a disc-shaped ceramic body;

a pair of ring-shaped members constituted by metal bodies having outer diameters that are substantially equal to that of the disc-shaped member, arranged to sandwich the disc-shaped member from both sides of the disc-shaped member, and integrated with the outer peripheral portion of the disc-shaped member;

a tube-shaped member constituted by a metal body having an inner diameter substantially equal to the outer diameters of the pair of ring-shaped members and the disc-shaped member, for holding a pair of metal components and the disc-shaped member on an inside thereof; and a restriction member for suppressing rotation between the ring-shaped members and the tube-shaped member, wherein the restriction member comprises:

a protrusion protruding in a radially outward direction on the pair of ring-shaped members; and a notch, formed in the tube-shaped member, into which the protrusion is inserted, and the restriction member suppresses the rotation of the tube-shaped member in a circumferential direction about an axis of the tube-shaped member with the protrusion inserted into the notch.

2. The pillbox-type RF window according to claim 1, wherein the notch is formed in a direction orthogonal to the axis of the tube-shaped member.

3. The pillbox-type RF window according to claim 1, wherein the protrusion is provided at multiple locations on outer peripheries of the ring-shaped members so as to respectively protrude in the radially outward direction.

4. The pillbox-type RF window according to claim 1, wherein one surface of the ring-shaped members faces toward the disc-shaped member and the other surface of the ring-shaped members is connected to a rectangular waveguide that is configured to be in a square tubular shape.

5. The pillbox-type RF window according to claim 1, wherein the notch penetrates through the tube-shaped member, in a direction parallel to the axis of the tube-shaped member, at an outer peripheral portion of the tube-shaped member.

6. A manufacturing method for a pillbox-type RF window having an input/output window in a microwave tube, the manufacturing method comprising:

fabricating a disc-shaped member in which a metallization layer is formed on an outer peripheral portion of a disc-shaped ceramic body;

fabricating a pair of ring-shaped members by metal bodies having outer diameters that are substantially equal to that of the disc-shaped member;

sandwiching the disc-shaped member from both sides of the disc-shaped member by the pair of ring-shaped members and integrating the pair of ring-shaped members with the outer peripheral portion of the disc-shaped member; and arranging the pair of ring-shaped members and the disc-shaped member inside a tube-shaped member constituted by a metal body having an inner diameter substantially equal to the outer diameters of the pair of ring-shaped members and the disc-shaped member, wherein the manufacturing method further comprises:

before the arranging the pair of ring-shaped members and the disc-shaped member inside the tube-shaped member, positioning the ring-shaped members with respect to the tube-shaped member in a circumferential direction by a restriction member that restricts rotation between the ring-shaped members and the tube-shaped member, wherein the restriction member comprises:

a protrusion protruding in a radially outward direction on the pair of ring-shaped members; and a notch, formed in the tube-shaped member, into which the protrusion is inserted, and in the positioning, the rotation of the tube-shaped member in a circumferential direction about an axis of the tube-shaped member is suppressed with the protrusion inserted into the notch.

* * * * *